United States Patent Office 3,592,723
Patented July 13, 1971

3,592,723
BONDED POLYETHYLENE GLYCOL TEREPH-THALATE ESTER FIBERS
Frank Lamb, Chadderton, Oldham, and John Michael Heaps, Gatley, England, assignors to Geigy Chemical Corporation, Greenburgh, N.Y.
No Drawing. Filed Feb. 2, 1966, Ser. No. 524,475
Int. Cl. D04h 1/04; C09j 5/00
U.S. Cl. 161—150
11 Claims

ABSTRACT OF THE DISCLOSURE

Polyester fibers bonded with a cyclic acetal by a process comprising contacting the outer surface of a mass of fibers with said cyclic acetal and heating the fiber mass at a temperature of from 100° to 250° C. Such bonded polyester fibers are useful in packaging and insulating.

---

The invention relates to bonded polyester fiber compositions as well as to processes of bonding synthetic fibers to form a cohesive material, and in particular to processes of bonding polyester fibers to produce bonded compositions useful as packing, filling, thermally insulating or electrically insulating materials.

The valuable properties of aromatic poly carboxylic acid polyester fibers especially those of the polyethylene glycol terephthalate type, are well known. Such fibers are hereinafter referred to for the sake of brevity as "polyester fibers." Although polyester wadding consisting of very short fibers produced in the weaving of the polyester fibers is already available, the commercial application of such wadding in packing, filling and insulating has hitherto been limited by the lack of a practicable process for bonding the wadding into a cohesive composition.

The process according to the invention of producing bonded polyester fibers comprises contacting at least part of the outer surface of a mass of the polyester fibers with a cyclic acetal of the formula

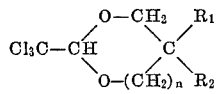

wherein $n$ is 0 to 1, and
each of $R_1$ and $R_2$ represents hydrogen, alkyl, halogenalkyl, free or esterified hydroxyalkyl or free or esterified carboxyl groups.

and preferably those wherein each of $R_1$ and $R_2$ represents hydrogen, lower alkyl, hydroxy-lower alkyl, chloro-lower alkyl, lower alkanoyloxy-lower alkyl, chlorinated lower alkanoyloxy-lower alkyl, carboxyl, lower alkoxy-carbonyl, carboxy-benzoyloxy- or carboxy-lower alkanoyloxy-lower alkyl. "Lower" used herein in connection with an aliphatic radical means that such radical has not more than 5 carbon atoms.

The mass of the polyethylene glycol terephthalate type polyester fibers may be contacted with the cyclic acetal in any of a variety of ways. For instance, the mass may be steeped in the liquid acetal, sufficient quantity of the acetal being present to saturate the mass with the acetal and/or to contact part or all of the outer surface of the fibrous mass. In another method, the mass of the polyester fibers may be sprayed with the liquid cyclic acetal, to coat part or all of the outer surface of the mass, and if desired, part or all of the interstices among the constituent fibers, with the acetal. Preferably, the fiber mass is contacted with the acetal at an elevated temperature and preferably at a temperature in the range of from 100° to 250° C., the temperature range from 150° to 250° C. being particularly preferred. The optimum temperature for contacting with any specific cyclic acetal depends largely on the nature of the cyclic acetal used. If the acetal is sprayed on the polyester fibers, the treated fiber mass is advantageously maintained at an elevated temperature, preferably within the range of from 100° to 250° C. for a further period after all the acetal has been sprayed on; this further period of heating may conveniently range from 5 to 30 minutes.

The polyester fiber material consisting of fiber forming high molecular esters of aromatic polycarboxylic acids with polyfunctional alcohols, and more especially of polyethylene glycol terephthalate and polycyclohexyl terephthalate fibers, e.g. "Terylene," "Dacron," "Tergal," "Trevira," "Kodel," or "Vespan."

The production of such fiber-forming polyesters has been described, for instance, in British Pat. 578,079.

The polyester material is conveniently in the form of a mass of short fibers produced in the weaving of the polyester.

The cyclic acetal used in the process of the invention may be, for example, 2-trichloromethyl-1,3-dioxolan, 2-trichloromethyl-4-methyl-1,3-dioxolan, or 2-trichloromethyl-4-chloromethyl-1,3-dioxolan, but is preferably trichloroethylidene glycerol (also known as 2-trichloromethyl-4-hydroxymethyl-1,3-dioxolan) or an ester thereof with an aliphatic or aromatic monocarboxylic acid or mixture of acids or with an aliphatic or aromatic dicarboxylic acid or mixture of acids. Examples of these cyclic acetals are described in British patent specification 646,918. Analogous compounds in which the methyl groups are replaced by other lower alkyl groups containing up to five carbon atoms may also be used.

Some of the cyclic acetals, for instance, trichloroethylidene glycerol, 2-trichloromethyl-4-methyl-1,3-dioxolan and 2-trichloromethyl-4-chloromethyl-1,3-dioxolan, are liquids at room temperature. Others are solids at room temperature, for instance 2-trichloromethyl-1,3-dioxolan (melting point 42° C.), and the process is therefore carried out at a temperature sufficiently elevated to ensure that the cyclic acetal is present as a liquid during the period of contacting the polyester fiber mass. If the cyclic acetal is a solid, it may conveniently be used in the process in the form of a dispersion, solution or emulsion in water or other expendable medium; if the medium is other than water, it is preferably a liquid cyclic acetal also effective in the process.

The following non-limitative examples further illustrate the present invention. Parts by weight shown therein bear the same relation to parts by volume as do kilograms to litres; parts and percentages are expressed by weight unless otherwise stated. Temperatures are in degrees centigrade.

EXAMPLE 1

To 73.5 parts of anhydrous glycerol are added 46 parts of anhydrous choral while stirring, the mixture being externally cooled so as to maintain the temperature below 30°. The resulting viscous mass is admixed with 12 parts by volume of concentrated sulfuric acid over a period of 1 hour while stirring. The temperature of the mixture is then raised to 120° under reflux conditions and maintained at that temperature for 8 hours.

The mixture is then allowed to cool to room temperature. Chloroform is added and the resulting solution is washed twice with 150 parts by volume of water, once with 100 parts by volume of aqueous sodium bicarbonate solution and finally three times with 200 parts by volume of water. The organic layer is separated off and dried over anhydrous magnesium sulfate. The solvent is removed by distillation. The resulting crude product is distilled to give trichloroethylidene glycerol of the formula

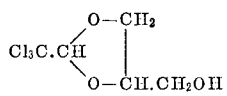

having boiling point 120°–122° C. at 1 Torr, the yield being 72% theoretical.

The cyclic acetal thus produced is used to bond polyester fibers by the following methods:

(A) 100 g. of polyester wadding obtained from polyethylene glycol terephthalate fibers produced as described in Example 1 of British Pat. 578,079, is placed in a vessel and sufficient of the above acetal is added thereto to saturate the mass. The vessel is then placed in an oil-bath maintained at 220° for 15 minutes, the contents of the vessel being continuously stirred. The same procedure is carried out separately at 175°, 190°, 200° and 210°.

(B) 100 g. of the same material as used under (A) is placed in an open vessel and heated in an air oven at 220° for 20 minutes. The cyclic acetal is then sprayed over the fibers to coat the outer surface and the sprayed fiber material is then heated for a further period of from 5 to 30 minutes. The same procedure is carried out separately at 175°, 190°, 200° and 210°.

In all these procedures, contacting of the polyester fibers with trichloroethylidene glycerol was found to result in the production of bonded polyester fibers in a form suitable for use as filling, packing or insulating material.

EXAMPLE 2

To a mixture of 182 parts of chloral hydrate and 553 parts of concentrated sulphuric acid were added during 40 minutes 76 parts of propylene glycol, the temperature being maintained at 10° to 15° C. After the addition, the reaction mixture was stirred for 2 hours at 0° to 10° C., then warmed to 25° C. and stirred for an additional 3-hour period. The mass was poured onto 1,000 parts of cracked ice. The lower dark oily layer was separated from the aqueous layer. The oil was dissolved in about 500 parts of methylene chloride and washed with water, with dilute bicarbonate solution, and again with water. It was dried with anhydrous sodium sulphate, treated with decolorizing charcoal, and filtered. The methylene chloride was removed under reduced pressure and the residue was distilled to give 2-trichloromethyl-4-methyl-1,3-dioxolan boiling at 45 C. at 0.5 mm. pressure, the yield being 52% theoretical.

2 - trichloromethyl-4-methyl-1,3-dioxolan has the formula:

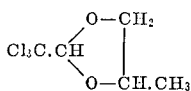

The cyclic acetal thus produced was used to bond polyester fibres as in Example 1 at 210° C.

EXAMPLE 3

138 parts of crude pentaerythritol were mixed with 120 parts of chloral and heated under reflux at 100° C. until a homogeneous syrup was obtained. 130 parts of concentrated sulphuric acid were then added slowly with stirring and heating at 100° C. was continued for a further two hours. The product was extracted with six lots of 500 parts of boiling water, leaving a residue of the di-cyclic acetal of chloral with pentaerythritol. The aqueous extracts were united and evaporated to about one-sixth of their bulk, on which a crystalline precipitate of 2 - trichloromethyl-5,5-bis-hydroxymethyl-1,3-dioxane was obtained, having the formula:

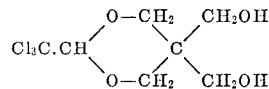

The yield of the cyclic acetal thus produced was 33% and it was used to bond polyester fibres as in Example 1 at 190° C.

EXAMPLE 4

A mixture of 67 parts of chloral hydrate and 50 parts of trimethylolpropane was stirred, cooled and treated dropwise with 54 parts of concentrated sulphuric acid at such a rate that the temperature did not rise above 20° C. After the addition the solution was heated for 2 hours at 65° to 70° C. The mixture was cooled and poured into 600 parts of ice-water. The oil which separated was extracted three times with 200 parts of chloroform. The chloroform extracts were washed with 200 parts of 5% sodium bicarbonate, 200 parts of distilled water dried over magnesium sulphate, filtered and distilled to remove the chloroform. The product, 2 - trichloromethyl-5-hydroxymethyl-1, 3-dioxane was distilled at 124° to 125° C. at 0.15 mm. pressure and recrystallised from 175 parts of hexane, the yield being 13% theoretical. The product had a melting point of 101° C. and has the formula:

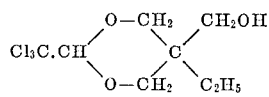

The cyclic acetal thus produced bonds polyester fibres as in Example 1 at 190° C.

EXAMPLE 5

2-trichloromethyl-1,3-dioxolan having the formula:

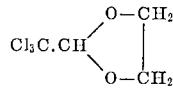

was obtained by condensing ethyleneglycol and chloral in the presence of concentrated sulphuric acid for 10 hours at 116° to 120° C. The product, the yield of which was 75% of theoretical, had a melting point of 42° C. The cyclic acetal obtained bonds polyester fibres as in Example 1 at 200° C.

EXAMPLE 6

2 - trichloromethyl-4-chloromethyl-1,3-dioxolan, having the formula:

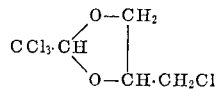

was obtained by refluxing trichloroethylidene glycerol with thionyl chloride in pyridine for 2 hours. The product distilled at 80° to 83° C. at 0.85 mm. pressure and the yield was 74% theoretical.

The cyclic acetal thus obtained was used to bond polyester fibres at 180° C.

EXAMPLE 7

2 - trichloromethyl - 5,5 - bis - acetoxymethyl - 1,3-dioxane having the formula:

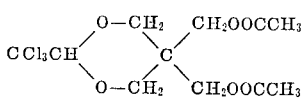

was obtained by acetylation of 2-trichloromethyl-5,5-bis-hydroxymethyl-1,3-dioxane using acetic anhydride and sodium acetate. The yield was 99% theoretical and the melting point was 75° C.

The cyclic acetal was used to bond polyester fibres at a temperature between 210°–250° C.

EXAMPLE 8

Trichlorethylidene glyceryl acetate having the formula:

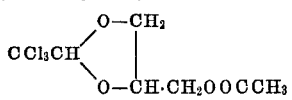

was obtained by acetylation of trichlorethylidene glycerol with acetic anhydride and sodium acetate. The yield was 74% theoretical and the boiling point was 110° to 112° C. at 0.6 mm. pressure.

The cyclic acetal was used to bond polyester fibres at 190° C.

EXAMPLE 9

Trichlorethylidene glyceryl trichloracetate having the formula:

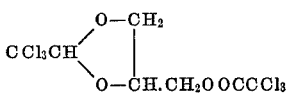

was obtained by the reaction of trichlorethylidene glycerol with trichloracetyl chloride in pyridine. The yield was 11% theoretical and the melting point was 89° to 90° C.

The cyclic acetal was used to bond polyester fibres at 200° C.

EXAMPLE 10

2-trichloromethyl-4-carboxy-1,3-dioxolan having the formula:

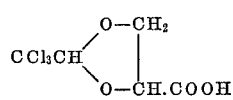

was obtained by oxidation of trichlorethylidene glycerol with alkaline potassium permanganate. The yield was 15% theoretical and the melting point was 128° C.

The cyclic acetal was used to bond polyester fibres at 160° C.

EXAMPLE 11

2-trichloromethyl-4-carbomethoxy-1,3-dioxolan having the formula:

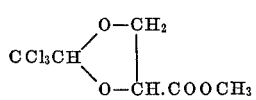

was obtained by oxidising trichlorethylidene glycerol with concentrated nitric acid and then reacting the product with a boron trifluoride/methanol addition compound. The boiling point was 82° C. at 0.6 mm. pressure and the yield was 71% theoretical.

The cyclic acid was used to bond polyester fibers at 195° C.

EXAMPLE 12

Mono-trichlorethylidene glyceryl phthalate having the formula:

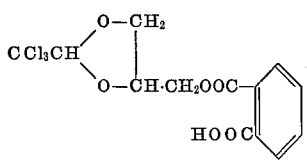

was obtained by reacting trichlorethylidene glycerol with phthalic anhydride in pyridine. The melting point was 115° C. and the yield 77% theoretical.

The cyclic acetal was used to bond polyester fibres at 200° C.

EXAMPLE 13

Mono-trichlorethylidene glyceryl succinate having the formula:

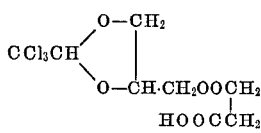

was obtained by reacting trichlorethylidene glycerol with succinic anhydride in pyridine. The yield was 72% theoretical.

The cyclic acetal was used to bond polyester fibres at a temperature between 210° and 250° C.

We claim:

1. A process of producing bonded fibers of high molecular esters of aromatic polycarboxylic acids with polyfunctional alcohols which comprises contacting at least part of the outer surface of a mass of the said fibers with a cyclic acetal of the formula

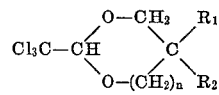

wherein $n$ is 0 to 1, and each of $R_1$ and $R_2$ represents hydrogen, alkyl, halogenalkyl, free or esterified hydroxyalkyl or free or esterified carboxyl groups, and heating the fiber mass which is contacted with the acetal at a temperature in the range of from 100° to 250° C.

2. A process as described in claim 1 wherein the tempeature is in the range of from 50° to 250° C.

3. A process as described in claim 1, wherein the mass of the polyester is steeped in the liquid acetal, sufficient quantity of the acetal being present to saturate the mass therewith.

4. A process as described in claim 1, wherein the mass of said fibers is sprayed with the acetal to coat at least part of the outer surface of the mass with the acetal.

5. A process as described in claim 1, wherein the said mass is in the form of short fibers produced in the weaving of the said fibers.

6. A process as described in claim 1, wherein the cyclic acetal is trichlorethylidene glycerol or a lower alkanoate thereof.

7. A process as described in claim 1, wherein each of $R_1$ and $R_2$ represents hydrogen, lower alkyl, hydroxy-lower alkyl, chloro-lower alkyl, lower alkanoyloxy-lower alkyl, chlorinated lower alkanoyloxy-lower alkyl, carboxyl, lower alkoxy-carbonyl, carboxy-benzoyloxy-lower alkyl or carboxyl-lower alkyl or carboxyl-lower alkanoyloxy-lower alkyl.

8. A process as described in claim 1, wherein said fibers are polyethylene glycol terephthalate fibers.

9. A composition of matter comprising a wadding of fibers prepared from a high molecular weight ester of polyfunctional alcohol and an aromatic polycarboxylic cyclic acid, said wadding of fiber being bonded with a cyclic acetal having the formula:

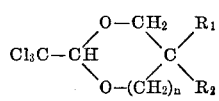

wherein $n$ is 0 to 1, and each of $R_1$ and $R_2$ represents hydrogen, alkyl, halogenalkyl, free or esterified hydroxyalkyl or free or esterified carboxyl groups.

10. A composition of claim 9 wherein said high molecular weight ester is polyethylene glycol terephthalate.

11. A composition of claim 10 wherein said cyclic acetal is trichlorethylidene glycerol or a lower alkanoate thereof.

References Cited

UNITED STATES PATENTS

| | | | |
|---|---|---|---|
| 2,296,375 | 9/1942 | Arundale et al. | 260—340.7 |
| 2,307,894 | 1/1943 | Mikeska | 260—340.7 |
| 2,525,681 | 10/1950 | Jones et al. | 260—340.7 |
| 2,543,101 | 2/1951 | Francis | 161—150 |
| 2,609,304 | 9/1952 | Jones et al. | 260—340.7 |
| 3,010,858 | 11/1961 | Sexsmith | 161—150 |
| 3,140,265 | 7/1964 | Richter | 161—169 |
| 3,379,736 | 4/1968 | Dietrich | 260—340.9 |

ROBERT F. BURNETT, Primary Examiner

L. M. CARLIN, Assistant Examiner

U.S. CL. X.R.

156—305